(12) United States Patent
Conca et al.

(10) Patent No.: US 7,442,362 B2
(45) Date of Patent: *Oct. 28, 2008

(54) METHOD FOR PREPARING IRON OXIDES

(75) Inventors: Esterino Conca, Novara (IT); Carlo Rubini, San Fermo Della Battaglia (IT); Guido Petrini, Galliate (IT)

(73) Assignee: Sud Chemie MT S.r.l., Milan (IT)

( * ) Notice: Subject to any disclaimer, the term of this patent is extended or adjusted under 35 U.S.C. 154(b) by 648 days.

This patent is subject to a terminal disclaimer.

(21) Appl. No.: 10/836,304

(22) Filed: Apr. 30, 2004

(65) Prior Publication Data

US 2004/0202606 A1 Oct. 14, 2004

Related U.S. Application Data

(63) Continuation of application No. 10/386,798, filed on Mar. 12, 2003, now Pat. No. 6,790,274.

(30) Foreign Application Priority Data

Mar. 18, 2002 (IT) .......................... MI2002A0567

(51) Int. Cl.
*C01G 49/02* (2006.01)
*C01G 49/06* (2006.01)

(52) U.S. Cl. .................... 423/632; 423/634; 252/62.56; 106/456

(58) Field of Classification Search ................. 106/456; 423/632, 634; 502/316; 252/62.52
See application file for complete search history.

(56) References Cited

U.S. PATENT DOCUMENTS 2,636,892 A * 4/1953 Mayer ........................ 556/133
2,689,167 A * 9/1954 Dovey et al. ................. 423/634
4,061,725 A * 12/1977 Ohlinger et al. ............. 423/634
4,521,527 A * 6/1985 Frank et al. .................. 502/184
5,047,382 A 9/1991 Rudy et al.
5,885,545 A 3/1999 Pitzer
6,790,274 B2 * 9/2004 Conca et al. ................. 106/456
2001/0031235 A1 10/2001 Imai et al.
2002/0028353 A1 3/2002 Hayashi et al.

FOREIGN PATENT DOCUMENTS

DE 3622364 * 1/1987
GB 1 226 876 3/1971

OTHER PUBLICATIONS

Lee et al, "On the Correlation between hyperfine field and the particle size of fine goethite synthesized in chloride solution", Corrosion Science, 43, pp. 801-808, 2001.*
Translation of DE 3622364.*
Lee et al.; "On the correlation between the hyperfine field and the particle size of fine goethite syntehsized in chloride solution," *Corrosion Science*, 43 (2001) pp. 803-808.

* cited by examiner

*Primary Examiner*—C. Melissa Koslow
(74) *Attorney, Agent, or Firm*—Husch Blackwell Sanders LLP

(57) ABSTRACT

Highly pure iron oxides are prepared by reaction of metallic iron, in the form of microspheroidal particles or of scraps or cuttings, with an agitated aqueous solution of a mono- or polycarboxylic acid with a pKa of 0.5 to 6 relative to the first carboxyl and capable of decomposing, by heating in air at 200 to 350° C., to carbon dioxide and water, using 0.03 to 1.5 moles of acid per g-atoms of iron, a water/iron weight ration of 1 to 20, and by oxidation of the ferrous carboxilate to ferric salt, with an agent selected from oxygen, mixtures containing oxygen, hydrogen peroxide, organic peroxides and hydroperoxides.

2 Claims, No Drawings

METHOD FOR PREPARING IRON OXIDES

The following application is a continuation of U.S. patent application Ser. No. 10/386,798 filed Mar. 12, 2003 now U.S. Pat. No. 6,790,274.

FIELD OF THE INVENTION

The present invention relates to an improved method for producing highly pure iron oxides, usable in particular as pigments and as precursors of catalysts or of materials for electronic devices.

BACKGROUND OF THE INVENTION

The method most commonly used to produce iron oxides used as pigments employs, as its source material, pickling liquids that contain ferrous sulfate or chloride originating from the iron industry or from the process for producing titanium dioxide.

The acid aqueous solution of ferrous salts is first neutralized by dissolving iron scrap and is then treated in conditions of oxidation with sodium hydroxide to precipitate FeOOH nuclei which are then pumped into a reactor that contains iron scrap and is maintained in air stream.

The resulting ferric sulfate (chloride) hydrolyzes forming FeOOH or $Fe_2O_3$; the sulfuric or hydrochloric acid that is released reacts with the iron to form ferrous sulfate or chloride, which are then oxidized to ferric salts. The reaction time varies from a few days to several weeks, depending on the reaction conditions and on the type of pigment that is sought.

The advantage of the method, with respect to others, is the limited use of alkali and of ferrous sulfate or chloride. The small quantity of ferrous salt that is required initially is renewed continuously during the process by the dissolving of the iron by the sulfuric or hydrochloric acid released in the reaction.

The disadvantage of the method is the difficulty in eliminating, even after thorough washing, the impurities of sulfate and chloride anions that are present in the oxides, which have a negative effect on the quality of the pigments.

For example, in order to reduce these anions to values that are acceptable for the production of high-quality red pigments, it is necessary to treat the precipitated oxides with concentrated solutions of NaOH (U.S. Pat. No. 5,614,012).

GB 1226876 describes a method for producing highly pure FeOOH suitable for producing ferrites for use in electronic devices, wherein electrolytic iron with average dimension between 20 and 140 microns is reacted, in conditions of oxidation with air made to flow at high speed in order to maintain a uniform aqueous suspension of the iron particles, with an acid chosen among sulfuric acid, hydrochloric acid, nitric acid and acetic acid, used at a molar concentration of less than 0.01 and in a molar ratio with the iron of more than 0.02 and preferably between 0.26 and 0.55. Iron is used in an amount not exceeding 25 g/l and the weight ratio between the solution and the iron is at least 40.

The reaction temperature is between 50 and 70° C.: at temperatures above 70° C., there is an undesirable production of oxides such as spinel, which also form at temperatures below 70° C. if the iron concentration is higher than 25 g/l.

At temperatures below 50° C., the oxide particles that form are too fine and difficult to filter and wash in order to achieve values of impurities due to acid radicals of less than 0.1% by weight.

The sought dimensions of FeOOH are a few microns in length and more than 0.3 and 0.1 microns in width and thickness, respectively.

If the concentration of the acid is too high (more than 0.25 mol in the case of sulfuric acid), the FeOOH yield decreases even considerably due to the dissolving of iron ions in the mother liquor. The productivity of the method is 20-26 g of FeOOH per liter of suspension per hour.

SUMMARY OF THE INVENTION

The aim of the present invention is to provide a method for producing iron oxides that is capable of overcoming the difficulties of the methods of the prior art.

It has now been found unexpectedly that it is possible to reduce or eliminate the drawbacks of the processes of the prior art and obtain, with high productivities that are distinctly higher than those of hitherto known processes, and with substantially complete conversion of the iron to oxides that are practically free from alkaline, alkaline-earth and ammonium ions and in which after washing there are relatively small quantities of impurities related to anions of carboxylic acids, which however can be eliminated by heating in the step for converting the oxides to $Fe_2O_3$ oxides.

DETAILED DESCRIPTION OF THE INVENTION

The method according to the invention comprises the following steps:

a) reaction, in an agitated aqueous solution, of an aliphatic and/or aromatic carboxylic acid containing one or more carboxylic groups, with a pKa of 0.5 to 6 at ambient temperature with reference to the first carboxyl, capable of decomposing by heating in air at a temperature of 200 to 350° C., forming carbon dioxide and water, and of forming ferrous salts soluble in the aqueous solution in the reaction conditions, with microspheroidal iron having an average particle diameter of no more than 250 microns, preferably between 30 and 200 microns, or, always acting under agitation, with iron turning scraps or cuttings having dimensions such that their surface is greater than $0.01\ m^2$ per kg of iron and per liter of solution, using ratios between moles of acid and g-atoms of iron from 0.03 to 1.5 and water/iron weight ratios from 1 to 20, working at temperatures between 0 and 100° C.;

b) oxidation to ferric carboxylate of the ferrous carboxylate formed in a) with an oxidizing agent, used in excess of the stoichiometric value with respect to the oxidation of the ferrous salt to ferric salt, selected from oxygen, gaseous mixture containing oxygen, for example air, hydrogen peroxide, ozone, organic peroxides and hydroperoxides.

As an alternative, it is also possible to subject to oxidation preformed ferrous carboxylates obtained from the acids indicated in a) or mixtures thereof with one or more of said acids, using a molar ratio between the anion contained in the salt and in the acid (if mixtures with acids are used) and g-atoms of iron from 0.03 to 1.5. All the other conditions of the alternative related to the type of iron, the water/iron weight ratio, the reaction temperature, the oxidizing agent and the agitation of the medium are the ones indicated in a) and b).

Preferably, the temperature in a) and b) is between 5 and 70° C., the ratio between moles of acid and g-atoms of Fe is 0.05 to 0.8, and the water/iron weigh ratio is 2 to 10.

The oxygen and the air are used in high excess of the stoichiometric value for oxidation of the ferrous ion to ferric ion; the hydrogen peroxide, the ozone and the peroxides are in an excess of 2-4 times or more.

During step a), it is preferred to work in a stream of inert gas, such as nitrogen, in order to avoid the formation of explosive mixtures of oxygen with the hydrogen generated during the iron dissolution reaction.

It is also possible to perform steps a) and b) simultaneously: this is true in particular when using hydrogen peroxide, peroxides or hydroperoxides as oxidizing agents.

When using air or oxygen, one operates in a strong stream of gas in order to remove the generated hydrogen, thus avoiding the forming of explosive mixtures.

The step for oxidation of the ferrous salt to ferric salt can be performed in the presence -of germs of FeOOH prepared separately according to known methods.

The presence of germs allows to reduce the dimensions of the particles. For example, by using an inoculum of goethite in an amount between 4 and 10% by weight, and by working with oxygen at 30° C. and with an HCOOH/Fe ratio of 0.5 and total conversion of iron, a drastic reduction of the particle size is obtained.

The iron is preferably used in a microspheroidal form, with an average particle diameter of preferably 40 to 150 microns; the carbon content is preferably less than 0.15% by weight; elements such as manganese, nickel, copper and silicon, if present, are in quantities that are preferably lower than 1% by weight.

The manganese and nickel content is preferably lower than 0.05% by weight, and copper content is preferably lower than 0.2%.

Usable representative microspheroidal iron is obtained by metallurgical reprocessing, according to known methods, of scrap from the working of metal sheets.

Iron having the above described purity characteristics is particularly suitable for preparing highly pure iron oxides for pigments having valuable color characteristics and/or as precursors for preparing catalysts.

Depending on the applications of the oxides, it is also possible to use alloyed steels with an alloy element content of up to approximately 10% by weight.

Chromium, manganese, nickel, tungsten and silicon are representative alloy elements.

If iron oxides for preparing ferrites for electronic devices are of interest, electrolytic iron is used.

When using iron turnings, the times for complete conversion are longer. Scraps or pieces of iron that are larger than turnings can be used, so long as their area per kg of iron and per liter of reaction medium is more than 0.01 $m^2$.

Examples of usable carboxylic acids are: formic acid, acetic acid, glycolic acid, oxalic acid, trichloro-, dichloro- and chloroacetic acids, bromoacetic acid, iodoacetic acid, pyruvic acid, malonic acid and propionic acid.

Formic acid and acetic acid are preferred.

Under equal conditions, using hydrogen peroxide acetic acid produces goethite, glycolic acid a mixture of maghemite and hematite, while formic acid produces only maghemite. Acetic acid using oxygen at 30° C. produces, with a high yield, oxides with a high specific surface area, which can exceed 260 $m^2/g$; the phases are substantially the ones that can be obtained with formic acid but with a slightly different distribution.

The purity of the iron oxides that can be obtained with the method according to the invention is particularly high (provided one starts with pure iron), since the FeOOH precipitate that forms as goethite and/or lepidocrocite or as $Fe_2O_3$ maghemite) contains, after washing with water, relatively small (less than 0.5%) quantities of impurities deriving from the anions of carboxylic acids, expressed as carbon. Further, such FeOOH oxides have a specific surface area of 1 to 300 $m^2/g$.

These impurities can be eliminated completely during the step of heating in air the oxides to temperatures between 200 and 350° C. By heating at 400° C., goethite is converted to hematite; at 450° C., lepidocrocite is converted to maghemite, which becomes hematite above 450° C.

If distilled water is used in the preparation, cations such as alkali-and/or alkaline-earth cations and/or ammonium ions and sulfate and chloride anions are also absent.

The productivity of the method is distinctly higher than that of the methods of the known art: it is possible to obtain, for example, 290 g or more of $Fe_2O_3$ per kg of reacting mixture, using oxygen as an oxidizer and with oxidation times of 20 h, the $Fe_2O_3$ having a specific surface area of 1-15 $m^2g$.

When using hydrogen peroxide, the optimum temperature is 50-60° C.; the preferred ratio of hydrogen peroxide to iron is 1.4-1.8 moles of hydrogen peroxide per g-atom of iron; the oxidation time is longer than 8 hours and the preferred ratio between moles of carboxylic acid and g-atoms of iron is 0.6 or less; by using a ratio of approximately 1, the content of iron dissolved in the mother liquor can be very high but decreases practically to zero when using a ratio of 0.6 or less.

By using hydrogen peroxide and working with total conversion of the iron, it is possible to obtain, depending on the operating conditions, both pure goethite and pure maghemite or a mixture thereof.

For example, by using a ratio of 1.6 moles of $H_2O_2$ per g-atom of iron and a ratio of 1.12 moles of formic acid per g-atom of iron at 60° C. and with total conversion of iron, one obtains pure goethite; the same result is obtained by using acetic acid in a ratio of 0.5 moles per g-atom of iron.

Pure maghemite is obtained by using a ratio of 1.624 moles of $H_2O_2$ per g-atom of iron and a ratio of 0.4-0.6 moles of formic acid per g-atom of iron at 50-70° C. and with total conversion of iron.

By using oxygen, one obtains mixed goethite and lepidocrocite. With air, the reactivity is lower than in oxygen; the oxide specific area is smaller and the soluble iron is generally higher; at 50-70° C. it drops to values generally lower than 1% by weight of the iron used.

The specific surface area (BEI) of the phases remarkably depends on the operating conditions: if the composition of the system is set and the process is carried out in the absence of germs, said surface area depends only on the temperature.

The maghemite is in the form of globular elementary particles with a size on the order of 1 micron; the specific surface area is 4-12 $m^2/g$.

The particles are combined in aggregates that generally have dimensions of less than 10 microns.

In goethite obtained with hydrogen peroxide, the elementary particles are clustered in globules that in turn are partially aggregated.

By using oxygen, one obtains rounded particles that have a very fine structure, are loose and have dimensions that are even smaller than one micron or are agglomerated to form aggregates of even more than 10 microns.

The lepidocrocite and the goethite-lepidocrocite mixtures have the appearance of globular particles with a "desert rose"-like structure.

The various phases were monitored with the XRD method.

The following examples are given by way of non-limitative illustration of the invention.

EXAMPLES

The apparatus used in the various examples is constituted by a glass reactor with a volume of 1-3 liters fitted with a jacket, with a lid having various inlets and with a variable-speed agitator; for tests with a gaseous oxidizer, the reactor can be equipped with a gas-effect agitator and with a flow breaker.

A countercurrent cooling unit is arranged at the outlet of the reaction gases; a dosage pump is used to feed the hydrogen peroxide; there is a system provided with flow-rate adjustment and with flow measurement in the case of gas feed; moreover, a thermostat (cryostat) is used to regulate the temperature of the test by circulating fluid in the jacket of the reactor and a thermometer is used to monitor the operating temperature.

Example 1

200 cc of deionized water and 37 g of formic acid are placed in the 1-liter reactor, which is brought to 60° C. by means of the heating jacket; agitation is performed, and 40 g of microspheroidal iron are poured into the reactor. The iron is checked to ensure that it is properly kept in suspension and then a micropump is used to introduce in the reactor 100 cc of 35% hydrogen peroxide.

The addition operation lasts approximately 4.2 hours, and the temperature is kept at 60° C. throughout the test.

At the end, the entire mass is poured into a vessel, from which the unreacted iron is removed by means of a magnet. The product of the reaction is then recovered by filtration and placed in an oven at 140° C. for one night. The mother liquor is analyzed to determine the iron content. Substantially pure goethite is obtained: iron conversion is 90% and part of the metal is dissolved in the mother liquor. The specific surface area is 111 $m^2/g$.

Example 2

200 cc of deionized water and 33 g of formic acid are placed in the 1-liter reactor, which is brought to 60° C. by means of the heating jacket; agitation is performed, and 40 g of microspheroidal iron are poured into the reactor. The iron is checked to ensure that it is properly kept in suspension and then a micropump is used to introduce in the reactor 100 cc of 35% hydrogen peroxide as follows: pumping is performed at the rate of 13 cc/h for 4.1 hours and then at the rate of 3 cc/h for 16 hours. In total, the operation for adding the hydrogen peroxide lasts 20.5 hours and the temperature is kept at 60° C.

The resulting product is filtered and the precipitate is dried as in example 1.

The mother liquor is analyzed to determine the iron content. A mixture of goethite and maghemite is obtained; iron conversion is 100%; iron in the mother liquor is 5.8% of the fed iron.

Example 3

200 cc of deionized water and 16.5 g of formic acid are placed in the 1-liter reactor, which is brought to 50° C. by means of the heating jacket; agitation is performed, and 40 g of microspheroidal iron are poured into the reactor. The iron is checked to ensure that it is properly kept in suspension and then a micropump is used to introduce in the reactor 100 cc of 35% hydrogen peroxide.

The addition operation lasts approximately 16.7 hours and throughout the test the reactor is kept under a slight flow of nitrogen and the temperature is at 50° C.

At the end, the entire mass is filtered and the resulting solid fraction is placed in an oven at 140° C. for one night.

The mother liquor is analyzed to determine the iron content. One obtains pure maghemite with 100% iron conversion. Iron in the mother liquor is negligible; the specific surface area is 7.6 $m^2/g$.

Example 4

300 cc of deionized water and 16.5 g of formic acid are placed in the 1-liter reactor, which is brought to 20° C. by means of the heating jacket and kept under a slight flow of nitrogen; agitation is performed, and 40 g of microspheroidal iron are poured into the reactor. The iron is checked to ensure that it is properly kept in suspension and then the system is kept under nitrogen for 4 hours.

At the end, the nitrogen is replaced with oxygen and the system is kept at 20° C. for another 20 hours.

The resulting product is filtered and the solid fraction is dried at 140° C. for one night.

The mother liquor is analyzed to determine the iron content. A mixture of goethite and lepidocrocite is obtained, with 100% iron conversion and with 2.4% of the iron fed into the mother liquor. The specific surface area is 140 $m^2/g$, which becomes 48.1 $m^2/g$ by heating at 400° C.

Example 5

300 cc of deionized water and 16.5 g of formic acid are placed in the 1-liter reactor, which is brought to 70° C. by means of the heating jacket and is kept under a slight flow of nitrogen; agitation is performed, and 40 g of microspheroidal iron are poured into the reactor. The iron is checked to ensure that it is properly kept in suspension and the system is kept under nitrogen for 4 hours.

At the end, the nitrogen is replaced with oxygen and the system is kept at 70° C. for another 20 hours.

The resulting product is filtered and the solid fraction is dried at 140° C. for one night.

The mother liquor is analyzed to determine the iron content. A mixture of goethite and lepidocrocite is obtained with 100% iron conversion and with 0.38% of iron into the mother liquor. The specific surface area is 9.5 $m^2/g$, which becomes 20.5 $m^2/g$ at 400° C.

Example 6

300 cc of deionized water and 6.6 g of formic acid are placed in the 1-liter reactor, which is brought to 70° C. by means of the heating jacket and is kept under a slight flow of nitrogen; agitation is performed, and 40 g of microspheroidal iron are poured into the reactor. The iron is checked to ensure that it is properly kept in suspension and then the system is kept under nitrogen for 4 hours.

At the end, the nitrogen is replaced with oxygen and the system is kept at 70° C. for another 3 hours.

The mother liquor is analyzed to determine the iron content. A mixture of goethite and lepidocrocite is obtained with substantially complete iron conversion.

Example 7

300 cc of deionized water and 16.5 g of formic acid are placed in the 1-liter reactor, which is brought to 30° C. by means of the heating jacket and kept under a slight flow of nitrogen; agitation is performed, and 40 g of microspheroidal iron are poured into the reactor. The iron is checked to ensure that it is properly kept in suspension and then the system is kept under nitrogen for 4 hours.

At the end, the nitrogen is replaced with air and the system is kept at 30° C. for another 20 hours.

The residual iron is removed with a magnet, the remainder is filtered, and the solid fraction is dried at 140 20 C. for one night. The mother liquor is analyzed to determine the iron content. A mixture of goethite and lepidocrocite is obtained with a small quantity of hematite.

Iron conversion is 85.5% and the iron in the mother liquor is 15% of the fed iron.

Example 8

300 cc of deionized water and 13.2 g of formic acid are placed in the 1-liter reactor, which is brought to 30 20 C. by means of the heating jacket and kept under a slight flow of nitrogen; agitation is performed, and 80 g of microspheroidal iron are poured into the reactor. The iron is checked to ensure that it is properly kept in suspension and then the system is kept under nitrogen for 4 hours.

At the end, the nitrogen is replaced with oxygen and the system is kept at 70° C. for another 20 hours; the entire mixture is filtered and the solid fraction is dried at 140° C. for one night. The mother liquor is analyzed to determine the iron content. A mixture of goethite and lepidocrocite is obtained with substantially complete iron conversion and with 0.15% of the iron fed present in the mother liquor.

Example 9

1500 cc of deionized water and 15 g of formic acid are placed in the 3-liter reactor, which is brought to 30° C. by means of the heating jacket and kept under a slight flow of nitrogen; agitation is performed, and 300 g of microspheroidal iron are poured into the reactor. The iron is checked to ensure that it is properly kept in suspension and the system is kept under nitrogen for 4 hours.

At the end, the nitrogen is replaced with oxygen and the system is kept at. 30° C. for another 20 hours.

The residual iron is removed with a magnet, the remaining fraction is filtered and the solid fraction is dried at 140° C. for one night. The mother liquor is analyzed to determine the iron content. Pure lepidocrocite with a specific surface area of 6.8 $m^2/g$ is obtained, which becomes 18 $m^2/g$ at 400° C. Iron conversion is 95.7% and the iron in the mother liquor is 0.11% of the fed iron.

Example 10

1500 cc of deionized water and formic acid are placed in the 3-liter reactor, which is brought to 40° C. by means of the heating jacket and kept under a slight flow of nitrogen; agitation is performed, and 200 g of microspheroidal iron, in a ratio of 0.5 moles of formic acid per g-atom of iron, are poured into the reactor. The iron is checked to ensure that it is properly kept in suspension and the system is kept under nitrogen for 4 hours.

At the end, the nitrogen is replaced with oxygen and the system is kept at 40° C. for another 19 hours.

The product is filtered and the solid fraction is dried at 140° C. for one night. The mother liquor is analyzed to determine the iron content. One obtains a mixture of goethite and lepidocrocite with a specific surface area of 44 $m^2/g$, which becomes 28 $m^2/g$ at 400° C. Iron conversion is 100% and the iron in the mother liquor is 2.9% of the fed iron.

Example 11

1500 cc of deionized water and formic acid are placed in the 3-liter reactor, which is brought to 10° C. by means of the cooling jacket and is kept under a slight flow of nitrogen; agitation is performed, and 300 g of microspheroidal iron, in a ratio of 0.22 moles of formic acid per g-atom of iron, are poured into the reactor. The iron is checked to ensure that it is properly kept in suspension and the system is kept under nitrogen for 4 hours.

At the end, the nitrogen is replaced with oxygen and the system is kept at 10° C. for another 19 hours.

The product is filtered and the solid fraction is dried at 140° C. for one night. The mother liquor is analyzed to determine the iron content. Pure goethite with a specific surface area of 91 $m^2/g$ is obtained, which becomes 37 $m^2/g$ at 400° C. Iron conversion is substantially complete and the iron in the mother liquor is negligible.

Example 12

1500 cc of deionized water and formic acid are placed in the 3-liter reactor, which is brought to 5° C. by means of the cooling jacket and is kept under a slight flow of nitrogen; agitation is performed, and 200 g of microspheroidal iron, in a ratio of 0.27 moles of formic acid per g-atom of iron, are poured into the reactor. The iron is checked to ensure that it is properly kept in suspension and the system is kept under nitrogen for 4 hours.

At the end, the nitrogen is replaced with oxygen and the system is kept at 5° C. for another 19 hours.

The residual iron is removed with a magnet and the remaining product is filtered and the solid fraction is dried at 140° C. for one night. The mother liquor is analyzed to determine the iron content. Iron conversion is 97.8% and the iron in the mother liquor is 1.5%. The specific area of the particles is 144 $m^2/g$, which becomes 47.6 $m^2/g$ at 400° C.

The disclosures in Italian Patent Application No. MI2002A000567 from which this application claims priority are incorporated herein by reference.

What is claimed is:

1. FeOOH oxides having specific surface area of 1 to 300 $m^2/g$, said oxides being free of alkali and/or alkaline earth ions and/or ammonium ions and of sulfate and chloride anions.

2. Maghemite ($Fe_2O_3$) having specific surface area of 1-15 $m^2/g$, said maghemite being free of alkali and/or alkaline earth ions and/or ammonium ions and of sulfate and chloride anions.

* * * * *